United States Patent [19]

DiFrank

[11] Patent Number: 4,950,321

[45] Date of Patent: Aug. 21, 1990

[54] CERAMIC ORIFICE RING

[75] Inventor: Frank J. DiFrank, Toledo, Ohio

[73] Assignee: Owens-Illinois Glass Container Inc., Toledo, Ohio

[21] Appl. No.: 395,869

[22] Filed: Aug. 18, 1989

[51] Int. Cl.$^5$ .................. C03B 5/26; C03B 7/088
[52] U.S. Cl. .................. 65/325; 65/374.11; 65/374.12; 65/374.13; 222/591
[58] Field of Search .............. 65/325, 126, 221, 172, 65/374.12, 374.11, 374.13; 222/591

[56] References Cited

U.S. PATENT DOCUMENTS 2,190,296  2/1940  Richardson .................. 65/325

Primary Examiner—Joye L. Woodard

[57] ABSTRACT

An orifice ring insert formed of a heat resistant metal such as 50-50 nickel-chrome alloy is dropped into position within the orifice opening in the ceramic orifice ring. The ring is counterbored to receive the flange of the ring with sufficient clearance to permit expansion. A lock nut is threaded to the lower end of the insert. The lock nut has a slope to its upper surface that contacts the bottom of the ceramic orifice ring. This slope takes into consideration the relative thermal expansion rates of the metal insert and ceramic orifice member. The nut stays tight during operation but does not crack the ceramic.

3 Claims, 1 Drawing Sheet

CERAMIC ORIFICE RING

The present invention relates to the provision of a metal insert for a ceramic orifice ring in an outlet of a molten glass containing forehearth.

BACKGROUND OF THE INVENTION

In the past, forehearth outlets have been closed with ceramic rings that were lined with a metal sleeve such as disclosed in U.S. Pat. No. 3,508,904, to Keefer. In this patent a liner was formed of an inverted frusto-conical configuration mounted to cover the inner surface of the orifice ring. Resistance to the erosive and corrosive effect of moving molten glass at elevated temperature is recited as one benefit of the metal liner.

Another U.S. Pat. No., 2,433,116 to Greenbowe et al, discloses a platinum rhodium alloy liner for a continuous flow orifice through which molten glass for forming tubing is flowed. A metal clad, ceramic mandrel extends through the orifice member to serve as the former about which the molten glass flows in the production of glass tubing.

In the instance of U.S. Pat. No. 3,508,904, the metal orifice liner is disclosed as having its upper edge formed with a horizontal ledge that is, in effect, clamped between the upper surface of the orifice ring and the bottom surface of the feeder bowl.

In the Greenbowe et al patent the metal orifice liner or die appears to have its upper rim curled outwardly and downwardly with its outer rim extending into an annular space in the top of the ceramic orifice that is filled with a cement.

It is an object of the present invention to provide a ceramic feeder orifice with a metal insert that is held in the lower opening in the orifice ring It is a further object of the present invention to provide a metal insert for an orifice ring which is designed to fit loosely in the orifice from a horizontal dimension point of view but is held in the orifice by an annular threaded nut on the lower end of the insert It is a still further object of the invention to provide a metal insert that fits within the ceramic orifice of a glass feeder with the insert held by a threaded nut on the bottom of the insert where the nut has a specific upper sloping surface that engages the bottom of the orifice ring to firmly hold the insert but not crack the ring on thermal expansion.

Other and further objects will be apparent from the following description taken in conjunction with the annexed sheets of drawings.

DETAILED DESCRIPTION OF THE DRAWINGS

In the past, efforts to make metal inserts for orifice members that are conventionally made of refractory ceramic materials has not been successful for various reasons.

Three major problems which were encountered were; the thermal expansion characteristics of the metal versus the ceramic were not properly considered; roll pins that were used to hold inserts in place would not accommodate warp and would corrode long before the life of the insert had been realized.

The third problem was that prior attempts failed to take into consideration orifice ring handling and insert ring expansion during the start-up period, as well as during steady state operation.

While others have tried lining the entire orifice ring member with a metal material, this creates a gross thermal imbalance due to the increased cooling caused by the large metal area.

When insert rings were held from below, metal members with large bottom flanges were needed and the heat radiating surface of these metal holders would detrimentally cool the inserts and result in an impeded glass flow. Further, it was common to try to hold inserts with adhesives or mud packs that would be subject to failure, particularly in an orifice structure that was used in a gob feeder with a reciprocating plunger.

In view of the problems encountered in the past, it was found that a greatly simplified system for supporting a metal ring insert in the orifice ring was desirable.

Figure 1:
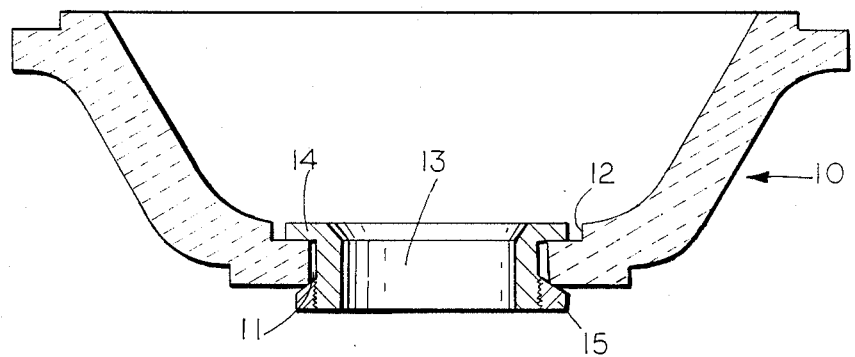
FIG. 1 is a vertical, sectional view through a feeder orifice member with a metal insert mounted therein.

With reference to FIG. 1, an orifice member 10 formed with a single opening 11 therein is counterbored at 12. A metal insert ring 13 having a horizontal flange 14 and an outside diameter somewhat smaller than the inside diameter of the orifice ring opening to avoid interference with thermal expansion of the ceramic orifice ring opening is positioned therein.

The member 13 may be dropped in the opening 11 of the ring 10 and a lock nut 15 is threaded onto the lower end of the metal ring 13. The upper surface 16 of the lock nut 15 is provided with a specific slope which takes into consideration the difference in thermal expansion characteristics of the metal insert ring and the ceramic orifice ring. During cold assembly the lock nut may be threaded onto the insert with the torque of a person's fingers.

The slope of the upper surface of the threaded lock nut is calculated by the formula:

$$\frac{H_C}{R_I\left(\frac{1 + \alpha_I \Delta T}{1 + \alpha_C \Delta T}\right)}$$

where:

$H_C$ is the thickness of the ceramic orifice member defining the opening 11;

$R_I$ is the outside radius of metal insert;

$\alpha_I$ is the thermal expansion rate for the insert ring material;

$\alpha_C$ is the thermal expansion rate for the ceramic orifice material; and $\Delta T$ is the temperature above room temperature.

Figure 2:
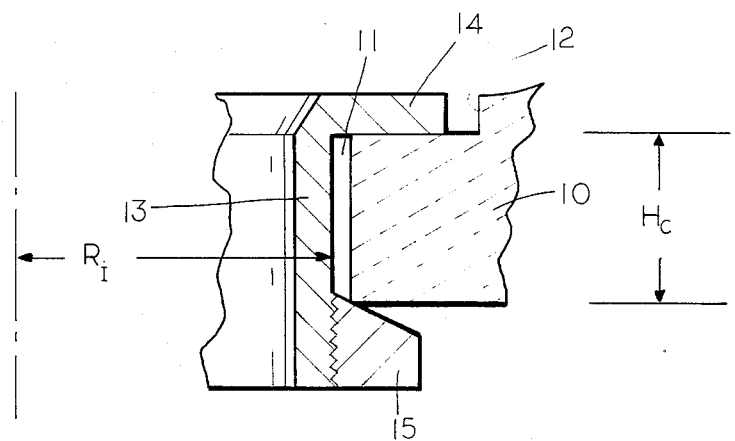
FIG. 2 is an enlarged cross-sectional view of the orifice area and metal insert of FIG. 1.

The dimensions are indicated in FIG. 2 of the drawing.

As a specific example, an orifice ring formed of Emhart 311 was counterbored to a 0.375 inch thickness with an orifice opening of 2.02 inches. The metal ring formed of stainless steel had an inside diameter of 1.750 inches and an outside diameter at the cylinder of 1.985. The threaded nut had an outside diameter of 2.361 inches. The flange 14 had an OD of 2.235. With this configuration a successful operation of feeding molten glass was carried out at a glass exit temperature of 2100° F. for an extended period of time without failure of the metal ring. The expansion rate for the ceramic orifice ring at 2100° F. was calculated to be 0.00808 inches per inch and the stainless steel had an expansion rate of 0.02375 inch per inch.

While stainless steel has been used successfully, a preferred metal for the insert is an alloy of nickel and chromium with about 50% of each.

The use of a stainless steel insert resulted in an extended useful life of the feeder system to about 1000 hours. With the Ni-Cr alloy insert dimensioned as illustrated on the drawing, the feeder was operated for greater than 5000 hours, without appreciable change in the orifice integrity.

The metal insert provides a glass feeder orifice that will retain its shape and size without change for an extended period of time. In the past, it was necessary to change ceramic orifices as frequently as every two or three weeks or 300 to 500 hours of use. The particular metal used as the insert material can be of any metal that can withstand temperatures in the 2100°–2300° range for an extended period without outgassing or changing shape. A more expensive metal that has been used at molten glass temperatures is platinum-rhodium alloys as suggested in the Greenbowe et al U.S. Patent cited above.

The important feature of the present invention is the use of a metal insert that only embraces the small orifice opening in a feeder orifice rather than lining the entire ceramic orifice member with the ring held in place against the up and down movement that a feeder plunger may induce by having a lock nut threaded onto the lower end of the ring. The lock nut is provided with a slope to its upper surface that engages the bottom of the ceramic orifice This slope is calculated so that during start-up of the feeder the expansion of the metal ring and the expansion of the ceramic orifice will be such that the nut retains contact with the bottom of the orifice while the gap 11 between the insert and orifice disappears when operating temperatures are reached. Thus when the operating temperature is reached, the outside diameter of the metal insert will have essentially the same diameter as the inside diameter of the ceramic orifice ring opening and during warm-up the relative expansions are such that the nut will retain the insert in the orifice ring.

While some heat loss may be experienced by the use of a metal insert ring, the opening may be made slightly larger than the size of the glass gob to be formed so that the proper size is maintained.

After start-up, the insert ring will be retained in its position as well and will experience very little wear.

While the present disclosure is directed to the provision of a metal insert ring in a single orifice feeder, the use of the metal rings of the invention have been used in plural gob feeders with equal success. The ease of mounting and the foolproof operation during start-up and continuous use has made the inserts of the invention valuable, since changing orifice rings every two to three weeks is no longer necessary. It is believed that with the present invention the orifice rings used in feeders for long running jobs may not need changing for close to a year.

Obvious modifications may be resorted to without departing from the scope and spirit of the invention as set forth in the following claims.

What is claimed:

1. The combination of a metal orifice ring insert and a ceramic orifice ring, said insert comprising a cylindrical metal insert member having a radially outwardly extending lip, said ceramic orifice ring comprising a ceramic bowl shaped ring member having a bottom wall with an orifice opening extending therethrough for receiving said insert member with the lip overlying the opening and the end of said insert member opposite said lip extending below the bottom wall of said ring member, said insert member being sized so as to fit in the orifice opening of said ceramic ring member with a predetermined annular gap therebetween, external threads formed on said insert member around the end extending below the ring member, an internally threaded metal nut for threading onto the threaded end of the insert member, said nut formed with an outwardly and downwardly sloped upper surface contacting the bottom edge of the opening in the ring member when threaded onto the threaded end of said insert member, said sloped upper surface having a slope matching the thermal expansion characteristics of the metal insert member and the ceramic ring member.

2. The combination of claim 1 wherein the slope of said upper surface is calculated by the formula:

$$\frac{H_C}{R_I\left(\frac{1 + \alpha_I \Delta T}{1 + \alpha_C \Delta T}\right)}$$

wherein:
$H_C$ is the height of the bottom wall of the ceramic ring member;
$R_I$ is the outside radius of the cylindrical metal insert member;
$\alpha_I$ is the thermal expansion rate for the insert member;
$\alpha_C$ is the thermal expansion rate for the ceramic ring member; and
$\Delta T$ is the temperature above room temperature.

3. A metal lined ceramic orifice ring for the feeding of molten glass from a forehearth comprising, in combination, a ceramic orifice ring member, said member having a bottom with an orifice opening extending therethrough and an annular, heat resistant metal insert positioned therein, said insert having a flange at one end overlying the upper edge of the opening in said orifice member and an opposite end extending below the bottom of said orifice ring member and having external threads thereon, a threaded metal nut threaded onto the threaded end of said insert, said nut having an outwardly and downwardly beveled upper surface engaging the bottom edge of said opening in the orifice ring member, said beveled surface being of a preselected angle and the internal diameter of said orifice ring member opening and the external diameter of said insert being chosen to allow for the differential thermal expansion of said ceramic ring member and said metal insert and nut, such that said insert will have the same outside diameter as the inside diameter of said orifice ring member opening at operating temperature and said nut will retain the insert in said orifice ring member opening during and after heat up to operating temperature.

* * * * *